June 19, 1928.
E. E. SLICK
ARTICLE OF MANUFACTURE
Filed Aug. 13, 1925
1,674,452
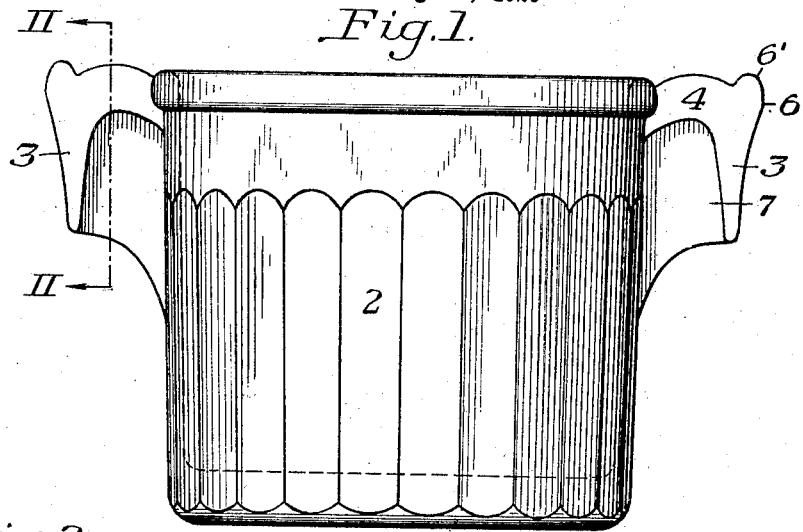
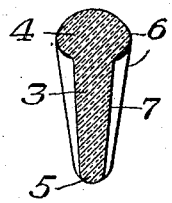
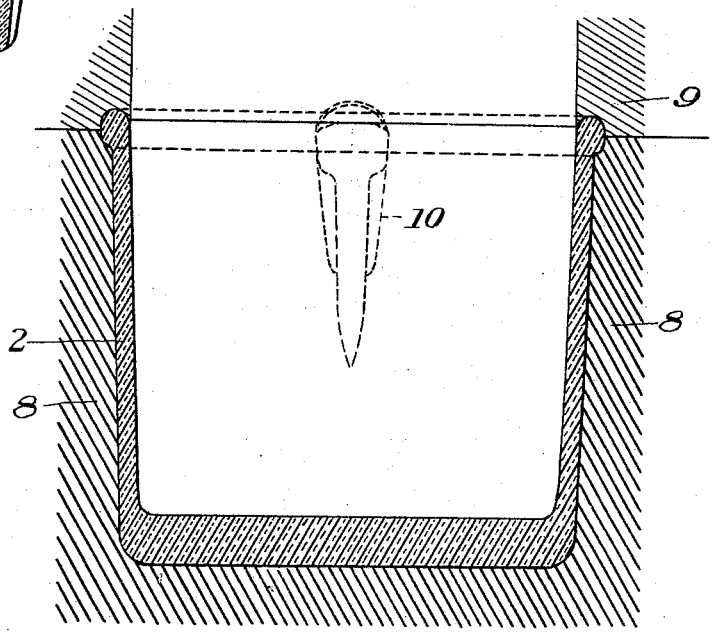
INVENTOR
Edwin C. Slick, Patented June 19, 1928.

1,674,452

UNITED STATES PATENT OFFICE.

EDWIN E. SLICK, OF PITTSBURGH, PENNSYLVANIA.

ARTICLE OF MANUFACTURE.

Application filed August 13, 1925. Serial No. 50,025.

The present invention relates broadly to articles of manufacture of the character adapted to be used as receptacles for different purposes and having handles to facilitate the use thereof, and more particularly to articles of this character such as lemon reamers, cups, sugar bowls, pitchers or other handled articles constructed of glass or other fragile or moldable material.

Heretofore in the art to which the present invention relates it has been customary to manufacture articles of the general character herein contemplated in split molds to permit the removal of the handled article from the mold. Such molds possess known disadvantages from the standpoint of the quality of the ware produced therein and also from the standpoint of the number of operations required to effect the completion of a single article.

The present invention has particularly for its object the production of an improved article of the general nature referred to of moldable material, irrespective of the nature or composition of such material and readily removable from a mold when completed.

In the accompanying drawings there is shown for purposes of illustration only one embodiment of the present invention, it being understood that the drawings do not define the limits of my invention as changes in the construction, nature and configuration of the article may be made without departing either from the spirit of the invention or the scope of my broader claims.

In the drawings:

Figure 1 is a side elevation of one form of article embodying the present invention;

Figure 2 is a detail sectional view on the line II—II of Figure 1;

Figure 3 is a partial sectional view, largely diagrammatic, through one form of mold capable of being utilized in accordance with the present invention.

It will be readily apparent to those skilled in the art that the utility of the present invention is not necessarily limited to the manufacture of glass, china, porcelain or other articles of any particular design or contour, but that it may be equally advantageous in the manufacture of various shapes and compositions such as celluloid, guttapercha and the like.

In carrying out the present invention there may be provided an article of manufacture of any desired composition or contour comprising a bowl or body portion 2 having one or more handles 3 suitably located and affording convenient means for handling the article. Each handle is preferably of improved construction of such general configuration as to provide a cross-section 4 of maximum thickness adjacent one end thereof, and a cross-section 5 of minimum thickness adjacent the opposite end, the relative positions of the thick and thin portions being determined entirely by the direction in which the article is to be removed from a mold.

In the illustrated embodiment of the invention each handle is shown as comprising a thickened edge 6 extending around the major portion of the handle and embracing a continuously extending intermediate body portion 7 which is preferably generally tapered downwardly throughout substantially its entire area. The thickened edge, however, is interrupted or discontinuous at the bottom or thin edge of the body portion, thereby providing a handle which may be conveniently grasped and which at the same time affords no projections preventing ready stripping thereof from a block mold.

The handle is preferably of such construction as to provide an enlargement or projection 6' at the upper outer portion of the thickened edge and extending either laterally or vertically with respect thereto. Such an enlargement or projection facilitates gripping the handle and enables the same to be effectively grasped with the fingers in a number of different positions. The thickened edge at the top portion prevents the fingers from slipping upwardly; the thickened edge at the side prevents the fingers from slipping outwardly; while the enlargement 6' may be effective in all directions. If desired, the thickened side edge may be entirely eliminated where the enlargement 6' is so shaped and positioned as to permit the fingers to hold the article in the required position, as will be readily apparent to those skilled in the art.

In Figure 3 of the drawings there is illustrated a mold body 8 having a suitable cavity for the production of the desired article, the mold body cooperating with a ring section 9 for forming the upper edge of the article. The body of the mold may also be provided with a mold cavity 10 of such shape as to produce a handle or handles of the desired configuration. Upon completion of the molding process and removal of the ring section which may be formed integrally with the core or separately therefrom as well understood in the art, the entire article may be moved axially of the mold. This eliminates the necessity of providing a split mold for the production of the handle or handles in order to permit the removal of the finished article from the mold.

A further advantage of the present invention arises from the provision of a handle of such nature that the thickened edge is effectively reinforced, the reinforcement providing gripping surfaces for the fingers of a person handling the same.

I claim:—

1. As an article of manufacture, a molded body having a portion of its top coinciding with a parting line of the mold and provided with a handle having its maximum cross sectional area adjacent one end and its minimum cross sectional area adjacent the opposite end, said handle having its maximum outward projection substantially in the plane of said mold parting line adjacent the top of the article, substantially as described.

2. As an article of manufacture, a receptacle provided with a handle having a wedge-shaped body portion having relatively flat sides gradually tapered downwardly, the body portion being completely open at its lower edge and having its minimum thickness from side to side at said lower edge, the substantially flat sides of said body portion providing a finger grip, substantially as described.

3. As an article of manufacture, a body provided with a handle having a thickened edge around the major portion thereof, said edge being discontinuous for at least one side of the handle, and comprising a substantially vertically extending portion spaced as far from the body at its lower end as it is at its upper end, substantially as described.

4. As an article of manufacture, a body provided with a handle having a thickened edge including a substantially vertical portion, said edge extending around the major portion of said handle and being discontinuous for at least one side of the handle, said edge decreasing in thickness toward said last mentioned side, substantially as described.

5. As an article of manufacture, a molded body having a mold line adjacent the top thereof and provided with a handle having its maximum width substantially in the plane of said mold line, substantially as described.

6. As an article of manufacture, a molded body having a mold line adjacent the top thereof and provided with a handle having its maximum width substantially in the plane of said mold line, said handle having a thickened edge along the top and one side thereof only, substantially as described.

In testimony whereof I have hereunto set my hand.

EDWIN E. SLICK.